United States Patent [19]

Vitek et al.

[11] Patent Number: 4,556,914
[45] Date of Patent: Dec. 3, 1985

[54] PHOTOGRAPHIC DOCUMENTATION SYSTEMS FOR CRT OR VIDEO IMAGING SCREENS

[75] Inventors: Richard K. Vitek, West Allis; Jeffrey B. Smoot, Sussex, both of Wis.

[73] Assignee: Fotodyne, Incorporated, New Berlin, Wis.

[21] Appl. No.: 429,059

[22] Filed: Sep. 30, 1982

[51] Int. Cl.$^4$ ............................................. H04N 5/84
[52] U.S. Cl. .................................. 358/244; 358/345; 346/110 R
[58] Field of Search ............... 358/244, 345, 244.1; 346/110 R, 107 R; 354/187, 194, 76

[56] References Cited

U.S. PATENT DOCUMENTS

| | | |
|---|---|---|
| 2,483,147 | 9/1949 | Mol ................................. 346/110 R |
| 2,612,824 | 10/1952 | Kroemmelbein ................ 358/244 X |
| 3,277,240 | 10/1966 | Marjoram et al. ............... 358/244 X |
| 4,191,962 | 3/1980 | Sramek ........................... 358/244 X |

Primary Examiner—Robert L. Richardson
Attorney, Agent, or Firm—Ronald E. Barry

[57] ABSTRACT

A photographic documentation apparatus for obtaining high resolution and continuous tone photographs of a TV monitor or CRT (Cathode Ray Tube) image, the apparatus including a main housing adapted to be mounted on the monitor to prevent movement and assure sharp photographs, a cover for opening the housing to view the monitor, and multiple camera carriages adapted to be mounted on the main housing, each carriage being designed to hold a different camera, and including a guide or indicia indicating the exact setting of each carriage in the main housing.

9 Claims, 7 Drawing Figures

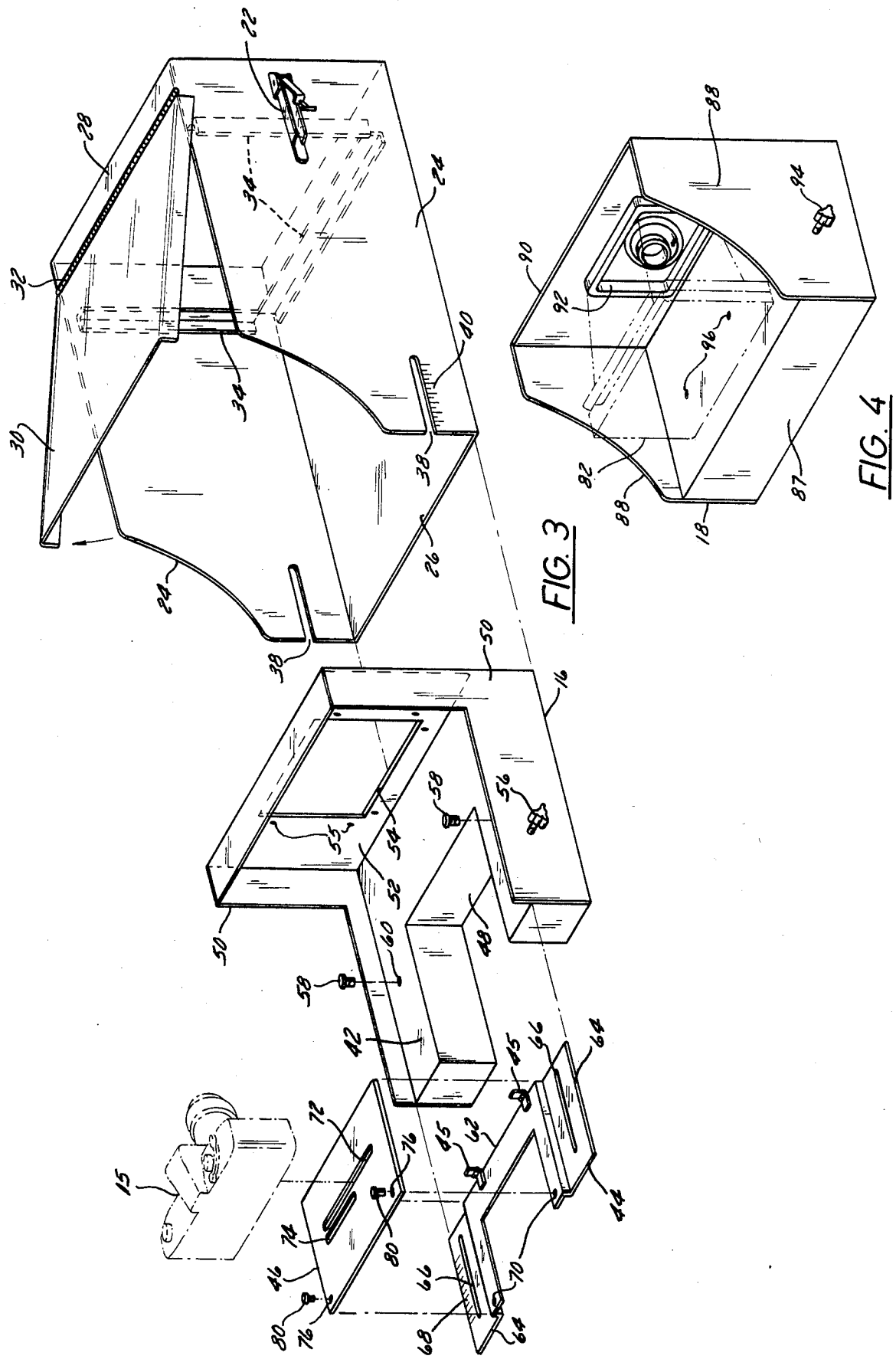

PHOTOGRAPHIC DOCUMENTATION SYSTEMS FOR CRT OR VIDEO IMAGING SCREENS

BACKGROUND OF THE INVENTION

Computerized analog tomography scanners, more commonly referred to as CAT or CT scanners, provide a continuous tone cross sectional view of the subject being examined. Photographs in the form of X-rays are produced from these scanners for use by scientists, medical researchers and doctors in their diagnosis and treatment of patients. It has become increasingly important to obtain high resolution hard copy diagnostic information for educational and scientific purposes. Hard copies can be produced on 35 millimeter or instant image cameras. However, in order to produce satisfactory copies from these cameras, hoods must be attached to the camera and/or to the front of the CRT screen in order to eliminate light glare and ambient, scattered, reflected light. Special hoods have been designed for use with each specific type of camera. High resolution continuous tone photographs of scientific, medical images are usually unattainable or are unreliable with presently available hand held cameras with attached hoods.

SUMMARY OF THE INVENTION

The modular photographic documentation apparatus of the present invention has been designed to provide a single apparatus that can be used for making hard copy from any CAT scanner system and/or other CRT displays used for diagnostic, medical or scientific examination. The apparatus includes a rigid main housing and interchangeable carriage for either 35 millimeter, instant image or multi-format camera systems. Each type of camera is mounted on a specific carriage which can be precisely located in the main housing which is attached to the monitor. This interchangeable feature makes it possible for the operator to rapidly and easily switch from one type of camera to another depending on the type of photograph desired. The rigid system as described herein will produce consistent sharp photographs meeting the reliability requirements of physicians and scientists. This is accomplished by providing longer exposure time for each picture which produces a greater depth of field not normally available with hand held cameras having attached hoods.

THE DRAWING

FIG. 3 is an exploded perspective view of the documentation apparatus with a 35 millimeter module.

FIG. 4 is a perspective view of a module for a Polaroid camera.

DETAILED DESCRIPTION OF THE INVENTION

Figure 1:
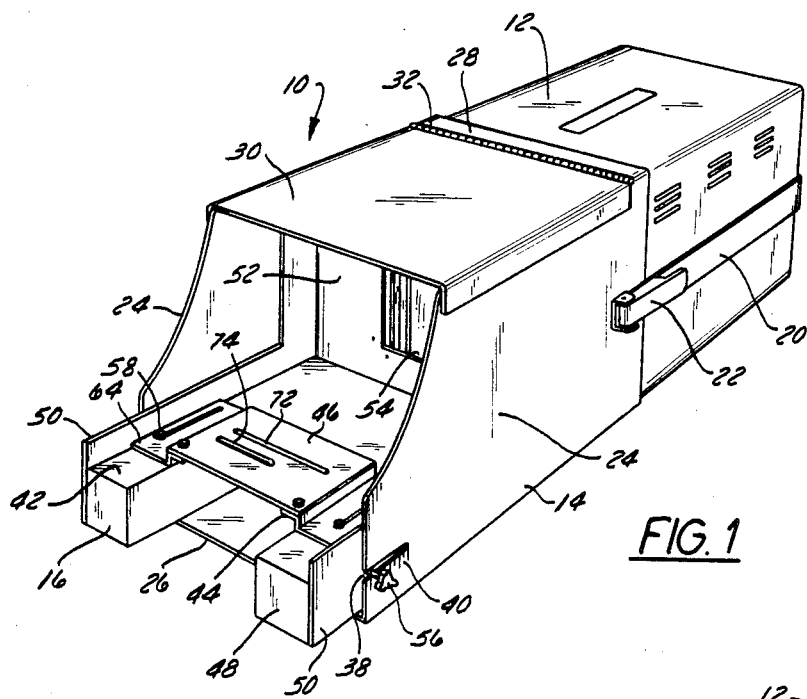
FIG. 1 is a perspective view of the documentation apparatus shown mounted on a TV monitor.
Figure 2:
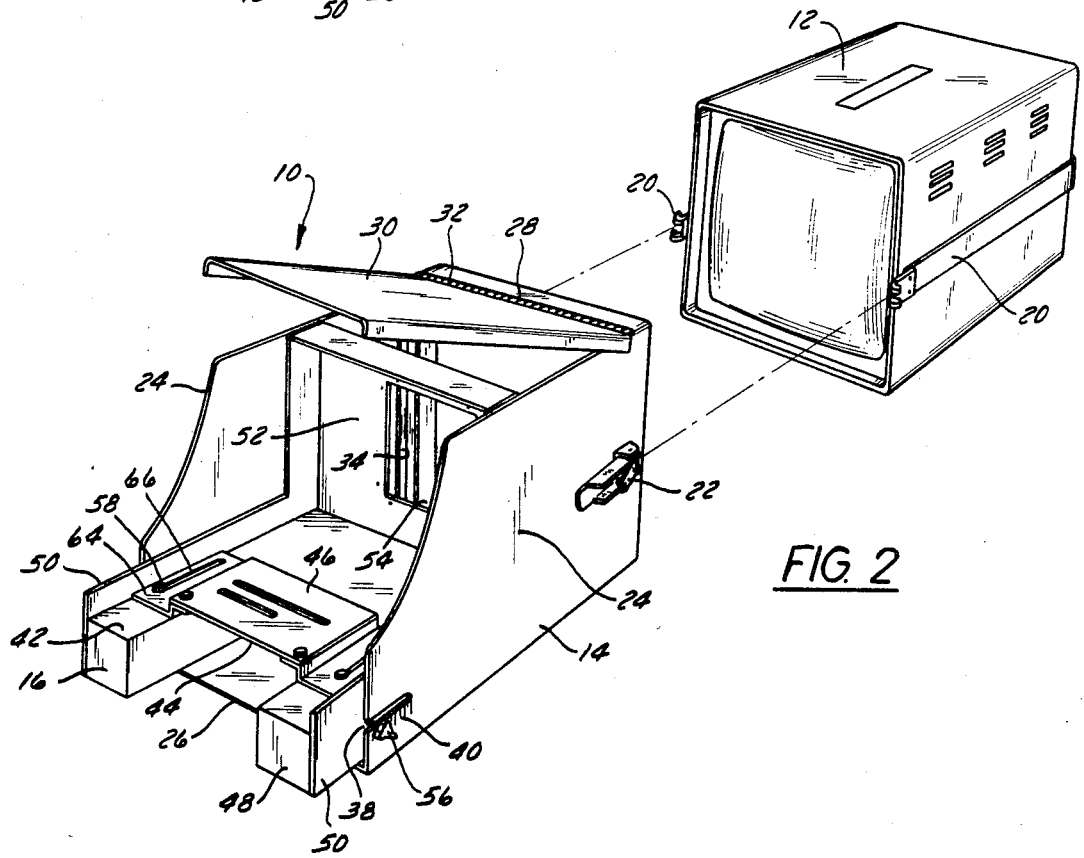
FIG. 2 is an exploded perspective view of the documentation apparatus of FIG. 1 with a 35 mm module mounted in the main housing.

The documentation apparatus 10 according to the present invention as shown in FIG. 1 is mounted on a TV monitor 12. The apparatus 10 includes a main housing 14 and a camera carriage or module 16 for a 35 millimeter camera 15 (FIG. 3). A Polaroid carriage or module 18 (FIG. 4) can be substituted for the module 16. The main housing, as seen in FIG. 2, includes means for securely attaching the main housing 14 to the front of the TV monitor 12. Such means is in the form of a strap 20 extending around the sides of the TV monitor 12 and a pair of latches 22 mounted on the sidewalls of the main housing 14. The main housing is positioned on the front of the monitor and the latches 22 snapped over the straps 20.

The main housing 14, as seen in FIG. 3, includes a pair of sidewalls 24, a bottom wall 26 and a connecting strap 28 at the top of the sidewalls. A cover 30 is pivotally connected to the strap 28 by means of a hinge 32. Means are provided within the main housing for positively locating the main housing on the TV monitor. Such means is in the form of a number of angle irons 34 mounted on the sidewalls 24 and the bottom wall 26. A pair of guide grooves 38 are provided in the sidewalls 24 to align the carriages 16 and 18 in the housing.

Means can be provided on the sidewalls next to the grooves 38 for indicating the exact location of the carriage with respect to the monitor. Such means is in the form of an indicia 40 provided on the sidewall 24. The indicia providing an indication of the distance from the front of the screen for the monitor 12.

The camera carriage 16 generally includes a base section 48 and a mounting tray 44. A mounting plate 46 is pivotally connected to the mounting tray 44 by means of a hinge 45. A 35 millimeter camera 15, shown dotted in FIG. 3, is secured to the mounting plate 46. The camera can be moved laterally on the mounting plate and longitudinally on the camera carriage in order to obtain an exact alignment of the camera with respect to the monitor 12.

In this regard, the camera carriage includes a base section 48, a flat top 42, a pair of sidewalls 50 and a front wall 52. The front wall includes an opening 54 and a number of pairs of threaded openings 55 around the opening 54. A pair of set screws 56 are provided on the sidewalls 50 for engaging the grooves 38 in the main housing 14. A pair of set screws 58 are provided on the base section 48 and are threadedly received in opening 60.

The mounting tray 44 includes a U-shaped center section 62 and a pair of flat guide plates 64, each of the guide plates 64 including a groove 66. A distance indicia 68 may be provided on the guide plates to indicate the distance of the guide plate from the front wall 52 if desired. The mounting tray 44 is placed on the base section 48 with the grooves 66 in alignment with the openings 60. The mounting tray is moveable longitudinally in the main housing within the limits of grooves 66 and is secured to the base sections by means of the set screws 58 provided on the base section. A pair of threaded openings 70 are provided on the legs of the U section 62.

The mounting plate 46 includes a pair of grooves 72 and 74 and a pair of openings 76. The openings 76 being located for alignment with the opening 70 in the mounting tray. The mounting plate is connected to the mounting tray by means of the hinges 45. The mounting tray is adjustable within very close limits by means of screws 80. Tilting of the mounting plate is provided to move the camera up or down with respect to the TV monitor. The camera is mounted in groove 72 and is adjustable laterally within the limits of groove 72 for locating the camera with respect to the opening 54. The camera rewind mechanism can be operated through groove 74 if necessary.

Figure 7:
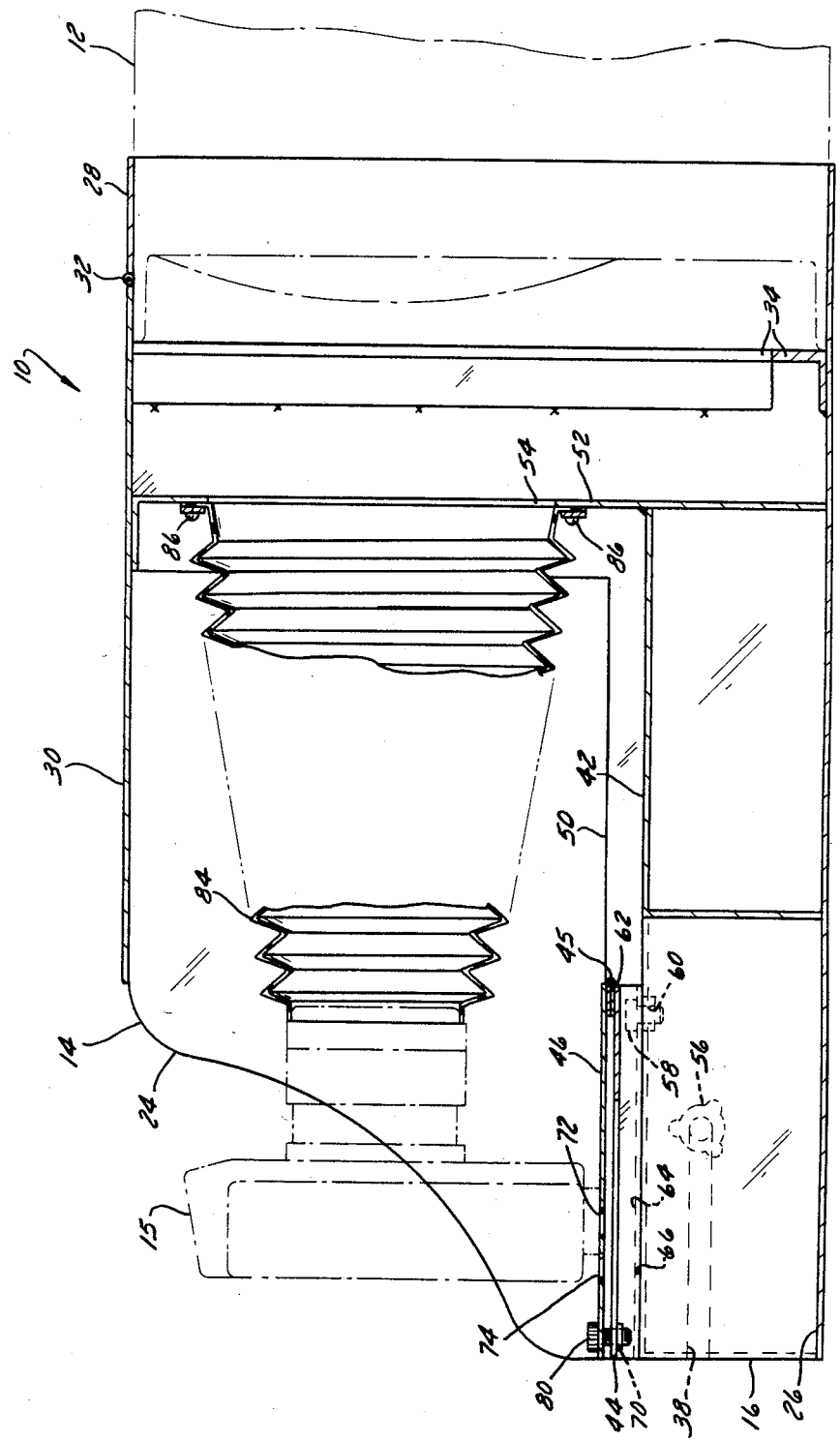
FIG. 7 is a side view in section of the documentation apparatus of FIG. 1 with a 35 millimeter module mounted in the main housing.

Means in the form of a bellows 84 (FIG. 7) is provided between the front wall 52 of the carriage and the lens of the camera 15. In this regard, the bellows 84 is attached to the front wall 52 by means of a number of screws 86 which are screwed into threaded openings 55. The other end of the bellows is attached to the front of the camera.

Figure 5:
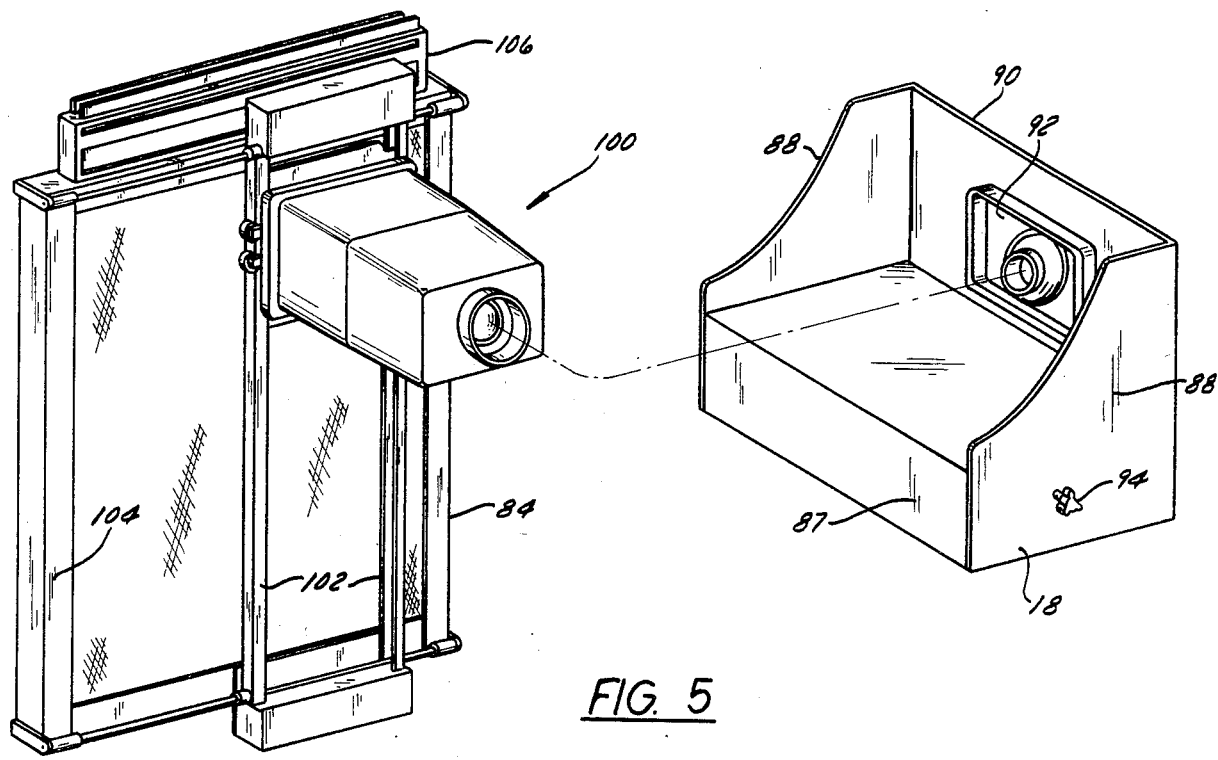
FIG. 5 is an exploded perspective view of a multi-format unit, using a Polaroid film which is adapted to be mounted on the Polaroid module.
Figure 6:
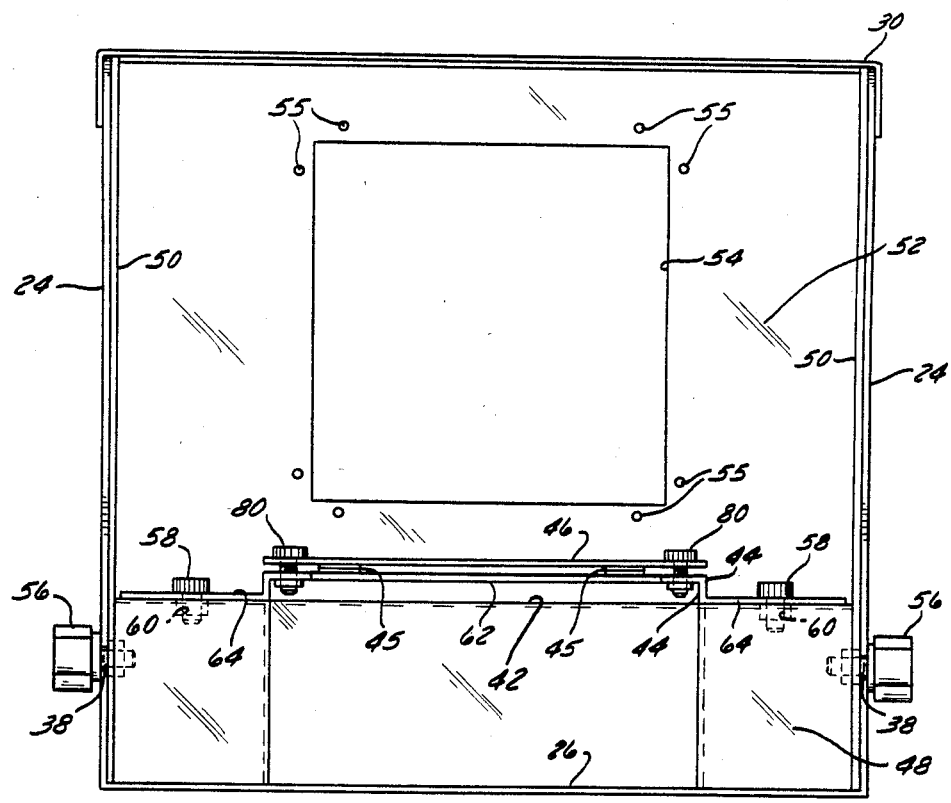
FIG. 6 is an end view of the documentation apparatus showing a 35 millimeter module mounted in the main housing.

Referring to FIGS. 4 and 5, the carriage 18 is used to hold a Polaroid camera 82 as well as the multi-format unit 84. The carriage includes a base section 87, a pair of sidewalls 88 and a front wall 90. The front wall includes an opening 92 for the polaroid lens. A pair of set screws 94 are provided in the sidewall of the carriage for engaging the guide grooves 38 in the sidewall of the main housing 14. A pair of holes 96 are provided in the base section 86 for locating the polariod camera on the carriage.

In use the main housing 14 is mounted on the front of the monitor 12 and latched to the strap 20 by the latches 22. If a 35 millimeter camera is to be used the carriage 16 is positioned in the housing with the set screws 56 aligned in the grooves 38. The camera is mounted on the mounting plate 46 and properly aligned in the groove 72. The mounting tray is adjusted to locate the camera a prescribed distance from the opening 54. The screws 80 are adjusted to tilt the camera slightly so that a picture will be taken of that portion of the screen that is to be preserved on the film.

If the Polaroid camera is to be used, the carriage 18 is positioned in the main housing 14 with the set screws 94 aligned in the grooves 38. The camera is mounted on the base section 87 through the openings 96. The distance of the camera from the screen is determined by the location of the set screws 94 with respect to the indicia 40 on the main housing.

Means are provided for observing the monitor screen prior to taking a picture. Such means is in the form of the cover 30 which can be opened to expose the screen to view by the operator. The screen can then be set for the proper contrast and brightness for the particular camera.

Referring to FIG. 5 the multi-format module 84 is shown which is used with a Polaroid camera 100. The camera 100 is mounted on a slide 102 provided on the frame 104 of the unit. The frame can be moved horizontally on the slide and the slide can be moved vertically on the camera. A film tray 106 is provided in the frame and is moved vertically or horizontally until completely exposed. The camera 100 is mounted on the base section 87 of the carriage 18 and the carriage is positioned in the main housing 14 with the set screws 94 positioned in the grooves 38. As each picture is taken the frame 104 is moved to place a different part of the negative in film tray 106 in alignment with the camera 100.

RESUME

The rigid system described herein provides reliable high resolution, continuous tone photographs which can be used for scientific and medical purposes as well as other applications. Longer exposure times are provided by the disclosed apparatus which results in consistent sharp reliable photographs having a greater depth of field as required for medical and scientific purposes. Photographs produced from this apparatus can be used for Forensics in law enforcement, computer graphics, medicine, education, and a variety of other applications.

We claim:

1. A modular photographic apparatus for producing high resolution photographs of the screen of a CRT or TV monitor, said apparatus including a rigid main housing, means for securing said housing to a TV monitor, carriage means for supporting a camera in said housing in a position to photograph the TV screen, said carriage means includes, a mounting tray, a mounting plate hingedly connected to said mounting tray and means for adjusting the position of the mounting plate on the mounting tray and means for securing said carriage means in said main housing whereby the position of a camera mounted on said plate can be changed slightly to focus on a different portion of the screen.

2. The apparatus according to claim 1 wherein said carriage means includes a bellows attached to the camera.

3. The apparatus according to claim 1 including means on said main housing for viewing the screen of the TV monitor.

4. A photographic documentation assembly for locating various cameras at preset positions for photographing the screen of a TV monitor, said assembly comprising a rigid housing having a bottom panel, a pair of sidewalls mounted on said bottom panel, a top strap connected to said sidewalls, a cover pivotally mounted on said strap, said bottom panel, sidewalls, strap and cover being arranged to enclose the screen of a TV monitor and a camera carriage removably mounted in said housing, said carriage including a base section, a front panel having a viewing opening and a pair of side walls for supporting a camera in a position to photograph the screen of a TV monitor through said opening.

5. The assembly according to claim 4 wherein said housing includes means for positively locating the TV monitor in the housing and latch means for securing the housing to said TV monitor.

6. The assembly according to claim 5 wherein said carriage includes a bellows surrounding said opening and adapted to be attached to said camera.

7. The assembly according to claims 4, 5 or 6 wherein said camera carriage includes a mounting tray positioned on said base section, a mounting plate pivotally connected to said mounting tray, and means for adjusting the position of the mounting plate whereby a camera mounted on said plate can be set to photograph a specific portion of said screen.

8. An apparatus for supporting a camera in a rigid position to photograph images formed on a CRT or TV monitor, said apparatus comprising a housing for enclosing the perimeter of the screen for a CRT or TV monitor, means on said housing for rigidly securing said housing to said screen, a carriage for supporting a camera, said carriage including a mounting tray, a mounting plate hingedly connected to said tray, means for adjusting the position of the mounting plate on the mounting tray, and means on said housing for indicating the position in the housing for the carriage corresponding to the camera mounted on the carriage.

9. The apparatus according the claim 8 wherein said carriage includes a viewing opening and a bellows enclosing said opening and adapted to be attached to said camera.

* * * * *